May 20, 1952  H. C. HANSON  2,597,727
FARM AND ROADSIDE SPRAYER
Filed April 22, 1950  2 SHEETS—SHEET 1

Inventor
Howard C. Hanson

May 20, 1952     H. C. HANSON     2,597,727
FARM AND ROADSIDE SPRAYER
Filed April 22, 1950     2 SHEETS—SHEET 2
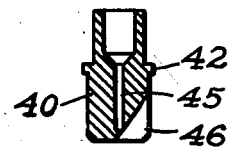
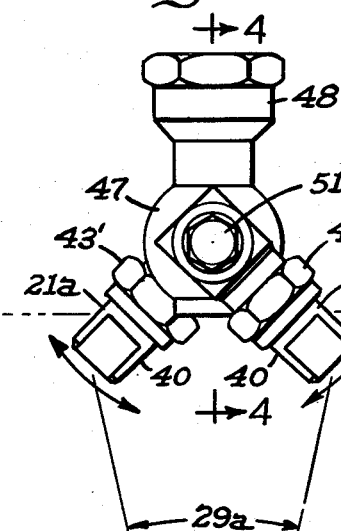
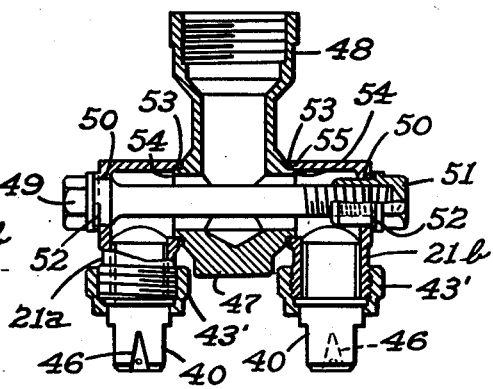
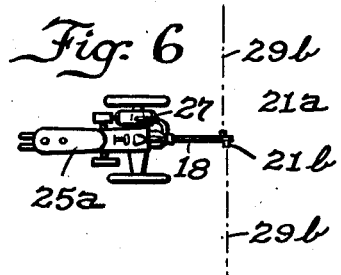
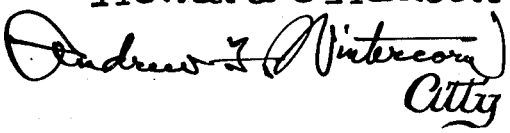
Inventor
Howard C. Hanson Patented May 20, 1952

2,597,727

UNITED STATES PATENT OFFICE 2,597,727

FARM AND ROADSIDE SPRAYER

Howard C. Hanson, Rockton, Ill.

Application April 22, 1950, Serial No. 157,515

5 Claims. (Cl. 299—39)

This invention relates to a new and improved farm and roadside sprayer.

Weed killing chemicals were first used in small quantities by home owners on their lawns. These successful applications soon led to the wider use of the chemicals in agriculture, and, doubtlessly because of the types of spraying apparatus that were previously used for row crop spraying of insecticides and fertilizers, and the like, more or less makeshift adaptations of these many-jointed boom type sprayers were used also in the application of these new chemicals. The booms varied in length from ten feet up to about sixty feet, and were fitted with nozzles closely spaced, to wet all of the width of swath taken in by the boom or booms. It goes without saying that such sprayers were cumbersome and slow in operation, and could only be used with some success where there were no obstructions. However, such devices were not at all suitable for roadside spraying, because of such obstructions as under-passes, guard rails, mail boxes, telephone poles, trees, and so forth. It is, therefore, the principal object of my invention to provide a new type of sprayer consisting of a single, relatively short, hand settable and manipulable boom carrying only one, or at most two, broad jet nozzles on the outer end thereof, the boom during most of its use being mounted on a universal joint support on the side of a motor vehicle carrying the pressure supply tank and pump equipment, so that the spray can be directed forwardly in the direction of travel of the vehicle at the proper angle in relation to the speed of travel, and also directed laterally at the proper angle in relation to the swath to be covered, the boom's connection with the support being detachable, to enable use of the sprayer effectively in orchards and other places where complete hand manipulation is necessary, thereby eliminating practically all of the objections that went with the use of the many-jointed boom type sprayers, and speeding up and greatly reducing the labor cost involved in the application of herbicides, fertilizers, insecticides, fungicides, and all other liquid agricultural chemicals along roadsides, and on fields, golf courses, and so forth. The sprayer of my invention not only does a quicker job, but, due to the wide angle of spray from the one or two nozzles, the larger weeds can no longer act as umbrellas for the smaller weeds, and, hence, a much more thorough and effective spraying job is assured. The use of two nozzles is particularly advantageous in field spraying, where it is important to have a much wider swath than in roadside work, for example, the one nozzle being turned to spray in one direction relative to the boom and the other in the opposite direction, each delivering a spray through an angle of approximately ninety degrees.

The invention is illustrated in the accompanying drawings, in which—

Fig. 3 is a side view of a two-nozzle fitting applicable to the sprayer of Figs. 1-2;

Fig. 4 is a cross-section on the line 4—4 of Fig. 3, but showing both nozzles in section in a common plane;

Fig. 5 is a section through one of the nozzle jets, and

Fig. 6 is a plan view of a tractor, showing how the two-nozzle fitting of Figs. 3 and 4 is adapted to be used on the rear of a tractor or other vehicle for wide swath spraying of fields, golf courses, parks, etc.

Similar reference numerals are applied to corresponding parts throughout the views.

Figure 1:
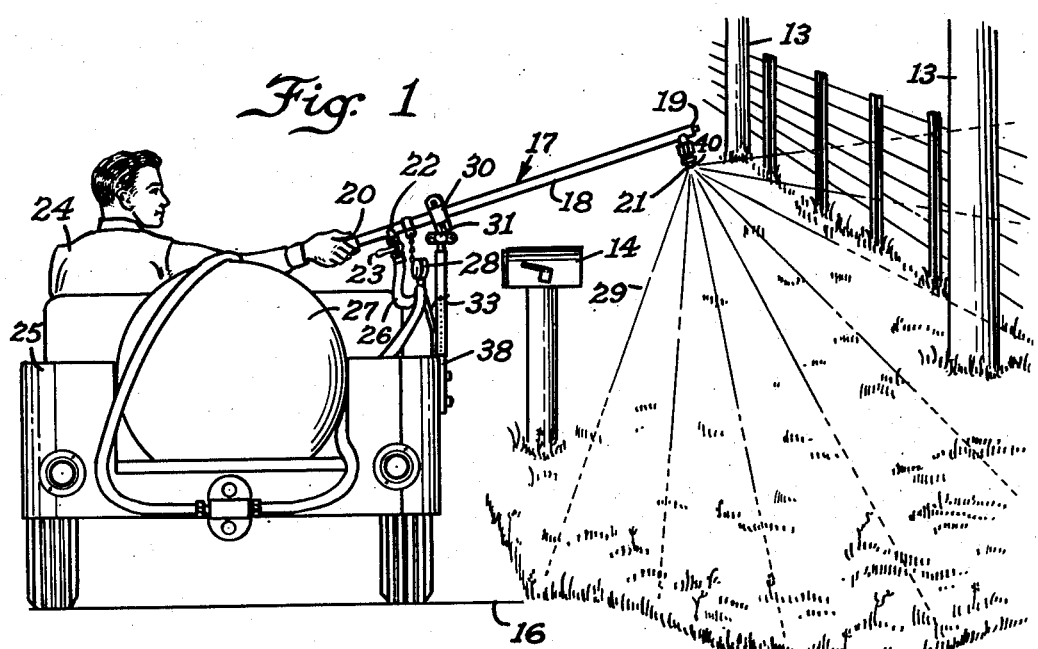
Fig. 1 is a rear view of a motor vehicle equipped with one of my improved sprayers, and showing the same in use for roadside spraying.
Figure 2:
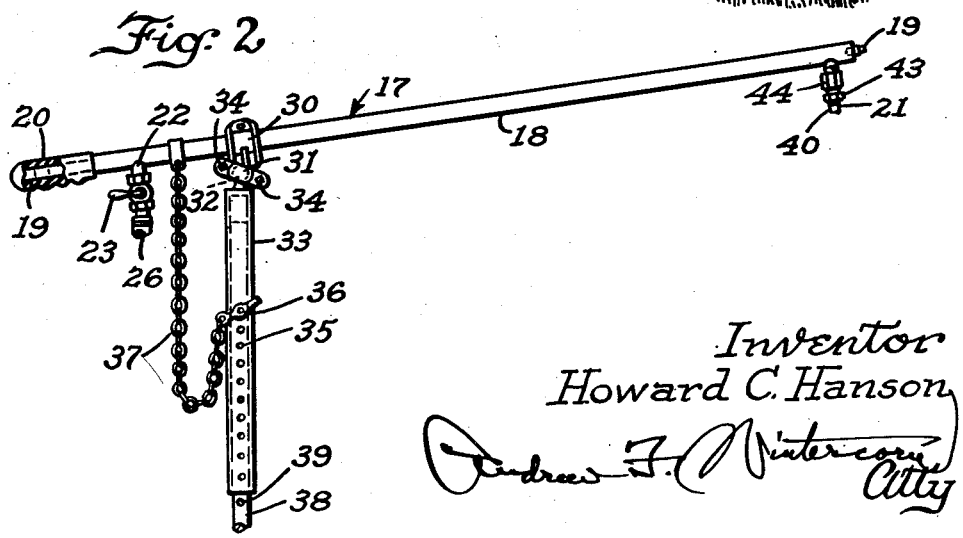
Fig. 2 is a slightly larger view of the sprayer by itself.

In the sprayer of my invention, indicated generally by the reference numeral 17 in Figs. 1 and 2, a single, relatively short, tubular boom 18 is provided, plugged at both ends, as indicated at 19, and equipped with a hand grip 20 on the inner end and usually only a single broad jet nozzle 21 on the outer end, the liquid agricultural chemical to be sprayed being delivered through the boom 18 to the nozzle 21 and supplied to the boom through a nipple 22 on the inner end portion thereof near the hand grip 20. A manually operable shut-off cock 23, that is within easy reach of the driver and operator 24 on the truck 25, serves to regulate the rate of flow and permits shutting off the flow and turning it on instantly from the driver's seat. A flexible hose 26 connected with the shut-off cock 23 communicates with the chemical tank 27 and with a power driven pump (not shown), so as to deliver the chemical to the boom 18 under a predetermined pressure that will be indicated on a gauge 28. The nozzle 21 delivers an even sheet-form of spray through an angle of approximately ninety degrees, as indicated at 29 in Fig. 1, and, depending upon the pressure and the operating conditions, a swath of anywhere from nine to nearly eighty feet in width can be sprayed, the gallonages per acre varying anywhere from five to one hundred gallons. A clamp 30 is applied to the boom 18 intermediate the ends thereof and nearest the hand grip 20 and has a two-piece socket 31 provided on the projecting end thereof, adapted to accommodate a ball projection 32 provided on the upper end of a tubular supporting standard 33 that is vertically adjustably mounted on the side of the truck 25. The two halves of the socket 31 may be drawn together by bolts 34 to clamp frictionally the ball projection 32 and thus hold the boom 18 at any desired angle of longitudinal inclination relative to the standard 33, and also at any angle of rotary adjustment about the vertical axis of the standard 33 as a center or about the longitudinal axis of the boom 18 as a center. Roadside and field spraying can be done at speeds up to twenty miles per hour quite effectively, because there is rarely any need for the driver-operator 24 changing the setting of the boom 18 as he drives along the road 16, the boom being set to clear such usual obstructions as mail boxes 14 and there being very few other obstructions that have to be considered. Thus, when the truck reaches a bridge, the spraying is continued right up to the bridge, the spray being shut off at the valve 23 when the truck reaches the bridge, without having to slow down or lift the boom. Ditch banks may necessitate the driver-operator tipping the boom down on its ball socket pivot to throw the spray into the ditches and banks. Roadside signs, guard rails, and the like, are no obstacles, because the spray from the nozzle 21 flows over and around them easily. Any trees too close to the road for the boom to pass may necessitate the driver-operator depressing the boom by means of the hand grip 20, without having to slow down or stop, and he can either let the spray continue or shut it off, depending on conditions. The standard 33 has a series of vertically spaced holes 35, in any one of which a pin 36, carried on a chain 37 attached to the boom 18, may be entered to set the standard 33 at any selected elevation with respect to a stationary post 38 fixed on the side of the truck, this post having vertically spaced holes 39 provided therein, any one of which may be made to register with one of the holes 35 in the standard 33 to receive the pin 36 and thus secure the boom 18 at the desired elevation and also prevent turning of the standard 33 about the post 38 as an axis and, accordingly, enable setting and maintaining the boom 18 in any desired position.

The nozzle 21 has a jet 40, like that shown in section in Fig. 5, the jet being of cylindrical form with an annular flange 42 projecting therefrom, so as to enable clamping the jet by means of a gland nut 43 to the nipple 44 forming the support on the outer end of the boom 18. A longitudinal axial passage 45 is provided in the jet 40, communicating at its outer end with a tapered or V-shaped slot 46 cut in the outer end of the jet at the angle shown.

Where two nozzles 21a and 21b are used, as illustrated in Figs. 3 and 4, they are swiveled on opposite sides of a T-fitting 47, which has an internally threaded end 48 adapted to thread on the nipple 44 (Fig. 2). A through-bolt 49 extends through registering holes 50 in the attaching end portions of nozzles 21a and 21b, and has a cap 51 threaded on the outer end thereof, which can be tightened to fasten the two nozzles in their angularly adjusted positions and, at the same time, compress the gaskets 52 and 53 provided at the outer and inner joints on each of said nozzles. The T-fitting 47 has reduced portions 54 entered in the bores 55 of the nozzles 21a and 21b to form swivel bearings for the nozzles on the T-fitting. Gland nuts 43' serve to fasten jets 40 on the nozzles 21a and 21b. These jets 40, as indicated in Fig. 4, are turned so that their slots 46 are directed in the opposite directions, and, depending, of course, upon the height from which the spraying is done, the nozzles 21a and 21b will be adjusted so that the sheet-sprays 29a (Fig. 3) from the two nozzles will meet or overlap to a slight extent, so as to leave no gap in the swath, in field spraying, for example. This arrangement of two nozzles 21a—21b may be used with the plane of each spray 29a parallel to the boom 18, the same as for spray 29 in Fig. 1, or the end 48 can be turned 90° so as to direct each spray in a plane at right angles to the boom 18, as indicated at 29b in Fig. 6, as when spraying with a wide swath fields, golf courses, parks, etc., with the boom directed rearwardly from the tractor or other vehicle 25a.

It is believed the foregoing description conveys a good understanding of the objects and advantages of my invention. The appended claims have been drawn to cover all legitimate modifications and adaptations.

I claim:

1. In a spraying device of the character described adapted for hand carry or vehicle mounting, the combination comprising a support adapted to be secured upon a vehicle, a boom having a longitudinal bore therein, means including a universal joint detachably connecting said boom directly with said support, means for clamping the members of said joint frictionally in any selected position of adjustment in both horizontal and vertical planes on said support thereby to enable said boom to be manually adjusted and to remain in any desired spray position on said support, nozzle means of the wide angle sheet spray type attached to the outer end of said boom and which communicate with the bore in said boom, and a fluid inlet connection also communicating with the bore in said boom adapted for attachment to a flexible conduit leading from a source of the spray fluid.

2. In a spraying device of the character described adapted for hand carry or vehicle mounting, the combination comprising a support adapted to be secured upon a vehicle, a boom having a longitudinal bore therein, a universal joint directly and detachably connecting said boom with said support, said joint comprising two separable members one of which is fixed to said boom and the other being fixed to said support, means for clamping the members of said joint frictionally in any selected position of adjustment in both horizontal and vertical planes on said support thereby to enable said boom to be manually adjusted and to remain in any desired spray position on said support, nozzle means of the wide angle sheet spray type attached to the outer end of said boom and which communicate with the bore in said boom, and a fluid inlet connection also communicating with the bore in said boom adapted for attachment to a flexible conduit leading from a source of the spray fluid.

3. A spraying device as defined in claim 3 wherein the support for said boom is constituted by a two part extensible standard, one of said parts being secured to the universal joint member and the other part being adapted to be secured in fixed vertical position upon the vehicle, and means for setting said parts in any desired extended position.

4. A spraying device as defined in claim 3 wherein said nozzle means is constituted by a pair of nozzles each of which delivers a wide angle sheet spray, said sprays being directable in substantially parallel planes but in opposite directions laterally from said boom.

5. In a spraying device of the character described adapted for hand use or vehicle mounting, the combination comprising a support adapted to be secured upon a vehicle, a boom having a longitudinal bore therein, a universal joint having separable ball and socket members for attaching said boom to said support, one of said members being carried by said boom and the other of said members by said support, means for frictionally clamping said socket member upon said ball member thereby to enable said boom to be manually adjusted and to remain in any desired spray position, wide angle sheet spray nozzle means attached to the outer end of said boom and which communicate with the bore in said boom, and a fluid inlet connection also communicating with the bore in said boom adapted for attachment to a flexible conduit leading from a source of the spraying fluid.

HOWARD C. HANSON.

REFERENCES CITED

The following references are of record in the file of this patent:

UNITED STATES PATENTS

| Number | Name | Date |
|---|---|---|
| 228,518 | Dawes | June 8, 1880 |
| 796,027 | Wittbold | Aug. 1, 1905 |
| 872,654 | Heard | Dec. 3, 1907 |
| 1,073,852 | Hayes | Sept. 23, 1913 |
| 1,348,038 | Neumeyer | July 27, 1920 |
| 1,503,001 | Murray | July 29, 1924 |
| 1,639,220 | Elder | Aug. 16, 1927 |
| 2,297,110 | Parker | Sept. 29, 1942 |
| 2,444,367 | Prescott | June 29, 1948 |
| 2,495,375 | Lishman | Jan. 24, 1950 |
| 2,507,668 | Hamilton | May 16, 1950 |

FOREIGN PATENTS

| Number | Country | Date |
|---|---|---|
| 809,270 | France | Dec. 3, 1936 |